(12) United States Patent
Enyedy et al.

(10) Patent No.: US 7,427,726 B2
(45) Date of Patent: Sep. 23, 2008

(54) GROUNDING ASSEMBLY FOR WELDING WIRE FEEDER

(75) Inventors: Edward A. Enyedy, Eastlake, OH (US); William T. Matthews, Chesterland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 308 days.

(21) Appl. No.: 11/327,048

(22) Filed: Jan. 6, 2006

(65) Prior Publication Data

US 2007/0158323 A1    Jul. 12, 2007

(51) Int. Cl.
*B23K 9/10* (2006.01)
(52) U.S. Cl. ................ 219/136; 219/137.2; 219/137.31
(58) Field of Classification Search ................ 219/132, 219/136, 137.2, 137.71
See application file for complete search history.

(56) References Cited

U.S. PATENT DOCUMENTS

| 1,512,788 | A | * | 10/1924 | Morton ..................... 219/124.1 |
| 4,508,954 | A | * | 4/1985 | Kroll ........................... 219/132 |
| 4,665,300 | A | | 5/1987 | Bellefleur |
| 5,278,390 | A | | 1/1994 | Blankenship |
| 5,410,126 | A | | 4/1995 | Miller |
| 5,836,539 | A | | 11/1998 | Grimm |
| 6,213,375 | B1 | | 4/2001 | Rybicki |
| 6,225,596 | B1 | | 5/2001 | Chandler |
| 6,570,130 | B1 | | 5/2003 | Kooken et al. |
| 6,657,163 | B1 | | 12/2003 | Blankenship et al. |
| 6,705,563 | B2 | | 3/2004 | Luo et al. |

FOREIGN PATENT DOCUMENTS

JP        57-019157        2/1982

OTHER PUBLICATIONS

Website Information "Ground Clamps"; www.weldingsupply.com/ welding supplies; Nov. 21, 2005.

* cited by examiner

*Primary Examiner*—Jessica Ward
*Assistant Examiner*—Devang Patel
(74) *Attorney, Agent, or Firm*—Fay Sharpe LLP

(57) ABSTRACT

A portable wire feeder for providing welding wire and welding current to a welding operation includes an input electrically connected to a power source. An output is electrically connected to the input to receive welding current delivered to the input from the power source and to provide the welding current and welding wire to the welding operation through a guide hose. A motorized wire feeding system includes a motor and a feed roll driven by the motor to direct the wire from a wire supply to the output for provision of the welding wire to the welding operation through the guide hose. Power for the motorized wire feeding system is drawn from the welding current passed from the input to the output. A grounding assembly nonattachably contacts a work piece of the welding operation to electrically ground the power drawn from the welding current directly to the work piece.

21 Claims, 7 Drawing Sheets

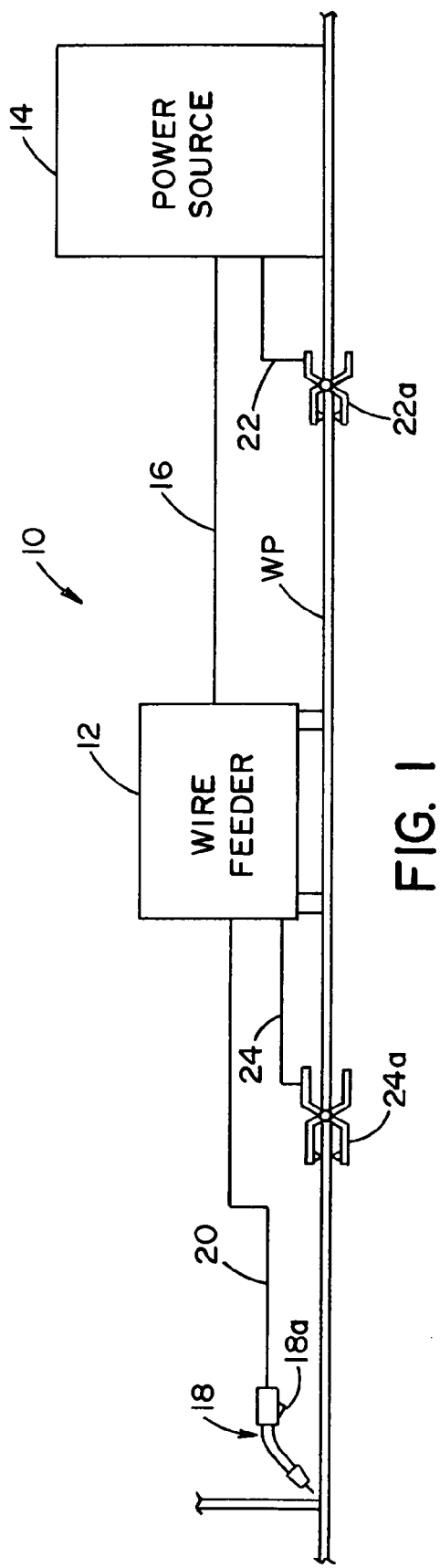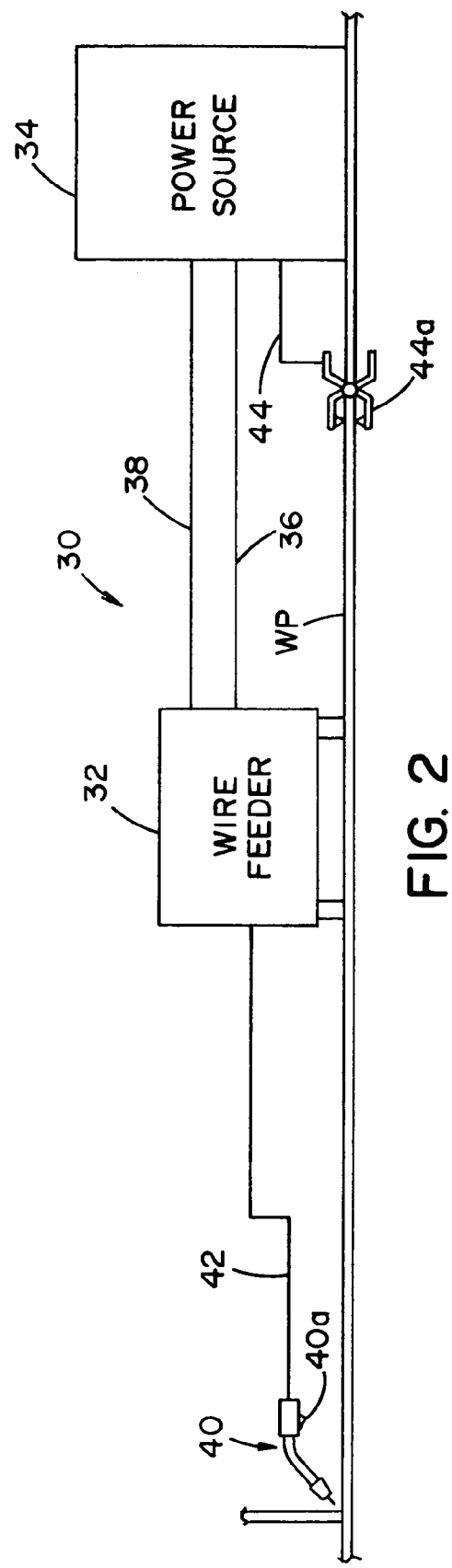

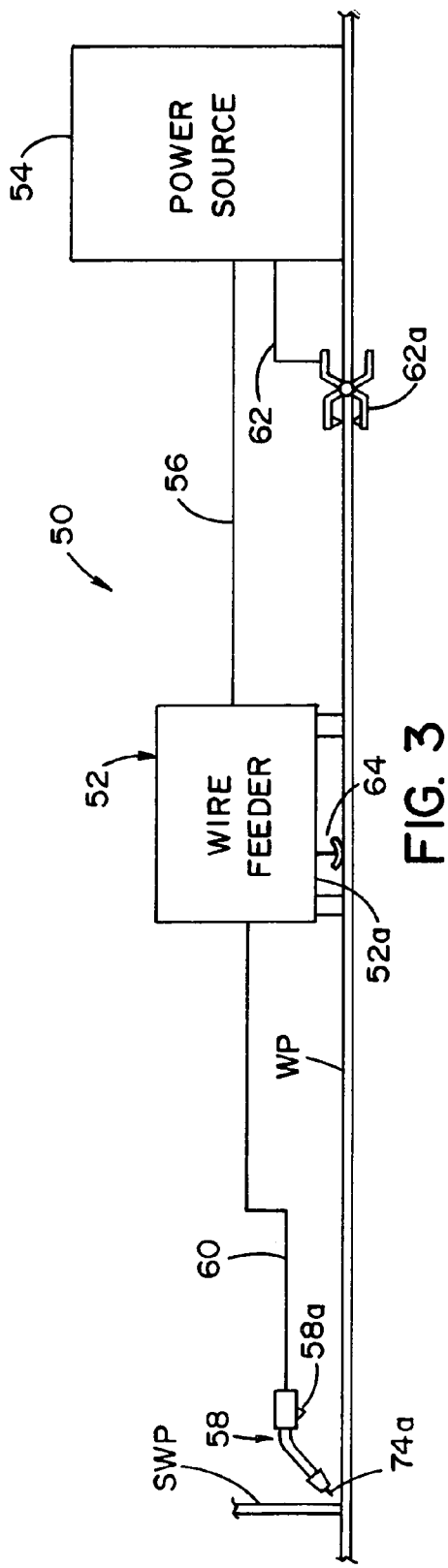
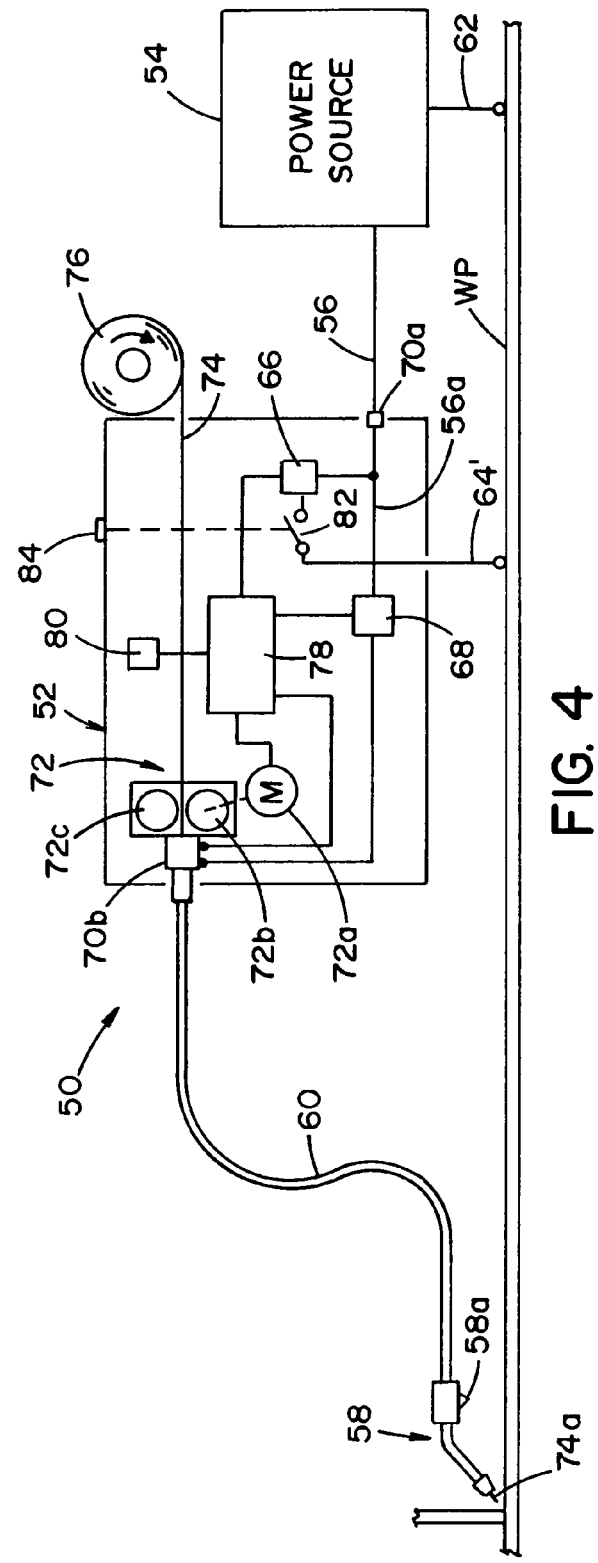
FIG. 3
FIG. 4

GROUNDING ASSEMBLY FOR WELDING WIRE FEEDER

BACKGROUND

1. Field of the Invention

Exemplary embodiments disclosed herein generally relate to electric arc engine welders, including those employing a welding gun for use in a welding operation and a wire feeder for supplying a consumable welding wire electrode to the welding gun. More particularly, exemplary embodiments disclosed herein relate to a grounding assembly for a welding wire feeder. The embodiments find particular application as (or in) portable electric arc engine welders, often used when the location of the welding operation is not expected to remain constant, such as, for example, welding operations at job sites which change day to day or welding operations covering large areas at a single job site. However, it is to be appreciated that the exemplary embodiments discussed herein are also amenable to other like applications.

2. Discussion of the Art

Electric arc engine welders are generally well known. Typically, in electric arc welders, a power source passes current between an electrode and a work piece. Often, the electrode is a continuous welding wire drawn from a supply of welding wire, such as a drum or reel, which is passed through a contact tip or gun on its way to being melted and deposited onto the work piece. Wire feeders are often used to advance the welding wire, preferably in a consistent and controllable manner, to the welding gun for use in the welding operation. Welding wire feeders can be manufactured in several forms, each optimized for a specific application. Common classifications of wire feeders include robotic wire feeders, portable wire feeders, tractor wire feeders and bench mount wire feeders.

Portable wire feeders are often used when the location of the welding operation or operations is likely to change or does not always remain constant (e.g., shipyards). This might include, for example, welding operations at job sites that change day-to-day or welding operations that cover a large area at a single job site. Examples of portable wire feeders are generally taught in the following U.S. patents: Bellefleur U.S. Pat. No. 4,665,300; Rybicki U.S. Pat. No. 6,213,375; Kroll U.S. Pat. No. 4,508,954; Chandler U.S. Pat. No. 6,225,596; Miller U.S. Pat. No. 5,410,126; Grimm U.S. Pat. No. 5,836,539; and Luo U.S. Pat. No. 6,705,563, all expressly incorporated herein by reference.

Preferably, portable wire feeders are able to supply their respective welding operations with welding wire in a manner much like that of a conventional stationary wire feeder. This is often more difficult in the portable wire feeder because it is likely to be subjected to repeated movement and used in connection with a wide range of work environments, many of which can be severe. In contrast, conventional stationary wire feeders are often used in controlled and unchanging environments, such as a work shop or factory floor. In addition to functioning like a stationary wire feeder, the portable wire feeder is preferably compact and lightweight enabling it to be more easily moved and used in confined work areas. Other desirable characteristics of portable wire feeders are ruggedness and durability.

In one conventional welding arrangement, a portable wire feeder is connected to a remotely positioned power source through one or more cables. The wire feeder is additionally connected to a welding gun by a guide hose. A motorized feeding system in the wire feeder employs rollers to advance or pay welding electrode wire. from a supply of wire (often a spool of wire) through the guide hose to the welding gun. For this purpose, the guide hose can include an internal tube for transporting the wire from the feeder to the gun, in addition to electrical wiring for providing power (such as control circuitry) to the gun. Optionally, the guide hose can further include passageways for transporting shielding gas to the gun and/or for circulating cooling fluid through or to the gun.

Through the one or more cables, the power source provides power to the motorized feeding system and control circuitry of the wire feeder, as well as welding current. With the power source grounded to a work piece to be welded, the provided welding current is selectively connected electrically to the electrode wire for creating a welding arc between the gun (whereat a portion of the welding wire is exposed) and the work piece. More particularly, a trigger on the gun can, when actuated, close a switch which causes a contactor in the wire feeder to provide welding current to the welding wire and thereby initiate the welding operation.

Power supplied to the wire feeder for the motorized feeding system and the feeder's control circuitry from the power source has to be grounded. For this purpose, the wire feeder is sometimes provided with a work sense lead, usually in the form of a wire extending from a side of the wire feeder (often oriented approximately normal relative to the work piece on which the wire feeder rests) with a clamp or clip at its end for removable attachment to the work piece. Alternatively, the work sense lead can include magnetic ground clamp for removably attaching to the work piece. Removably attaching the work sense lead to the work piece completes the power circuit. That is, power delivered to the wire feeder for the motorized feeding system and the feeder's control circuitry is grounded thereby creating a power circuit. In an alternate arrangement, one of the cables extending between the wire feeder and the power source can include suitable electrical wiring such that the wire feeder can be grounded back through the power source (i.e., the power circuit including the feeding system and control circuitry of the wire feeder is completed or looped through the power source). Unfortunately, this requires a cable separate from and in addition to the cable delivering welding current to the wire feeder.

One disadvantage of wire feeders having a work sense lead for grounding of the wire feeder directly to a work piece is that sometimes there is no convenient location for attaching the work sense lead to the work piece. This and/or a desire to have greater mobility of the wire feeder (i.e., movement of the wire feeder is limited by the length of the work sense lead) results in wire feeders being provided with relatively long work sense leads. The provision of a work sense lead, particularly a long work sense lead, can undesirably add to the number of cables and cable bundles accumulated about a work area. Wire feeders provided without work sense leads, as described in reference to the alternate arrangement discussed above, require an extra cable between the power source and the wire feeder. Like the provision of a work sense lead, requiring an extra cable also undesirably adds to the overall number of cables and cable bundles accumulated about a work area, in addition to undesirably requiring an operator to make extra cable connections.

SUMMARY

In accordance with one aspect, a portable wire feeder for providing welding wire and welding current to a welding operation is provided. More particularly, in accordance with this aspect, the wire feeder includes an input electrically connected to a power source and an output electrically connected to the input to receive welding current delivered to the input from the power source and to provide the welding current and welding wire to the welding operation through a guide hose. A motorized wire feeding system includes a motor and a feed roll driven by the motor to direct the welding wire from a wire supply to the output for provision of the welding wire to the welding operation through the guide hose. Power for the motorized wire feeding system is drawn from the welding current passed from the input to the output. A grounding assembly nonattachably contacts a work piece of the welding operation to electrically ground the power drawn from the welding current directly to the work piece.

In accordance with another aspect, a welding wire feeder is provided. More particularly, in accordance with this aspect, the welding wire feeding includes a housing electrically connected to a power source to receive welding current therefrom and having power for the housing drawn from the welding current. The power source is grounded to a work piece of the welding operation. A guide hose extends from the housing to the welding operation. An output is disposed on the housing for providing the welding current received from the power source to the welding operation through the guide hose. A grounding assembly extends from a side or surface of the housing directly opposing the work piece and electrically grounding the power drawn from the welding current to the housing.

In accordance with still another aspect, a wire feeder for supplying consumable welding wire to a welding gun is provided. More particularly, in accordance with this aspect, the wire feeder includes a housing having a grounding assembly nonattachably engaged with an associated work piece to electrically ground the housing thereto. The grounding assembly extends from the housing on a side thereof facing the associated work piece. A guide wire tube extends from the housing for directing the consumable welding wire to the welding gun. An input cable electrically connects the housing to an associated power source for receiving arc voltage therefrom. An advancing mechanism is connected to the housing for paying the wire through the guide tube to the gun. Power for the advancing mechanism is drawn from the arc voltage and is grounded through the grounding assembly.

BRIEF DESCRIPTION OF THE DRAWINGS

FIG. 1 is a prior art schematic view of an electric arc welder having a wire feeder grounded to a work piece through a work sense lead or cable.

FIG. 2 is a prior art schematic view of an electric arc welder having a wire feeder grounded to a work piece through an extra cable connection with the welder's power source, which is itself grounded to the work piece.

FIG. 3 is a schematic view of an electric arc welder having a wire feeder grounded to a work piece through a grounding member according to one exemplary embodiment.

FIG. 4 is a schematic view of the electric arc welder of FIG. 3 showing components of the welder's wire feeder and electrical connections related thereto.

DETAILED DESCRIPTION

Figure 5:
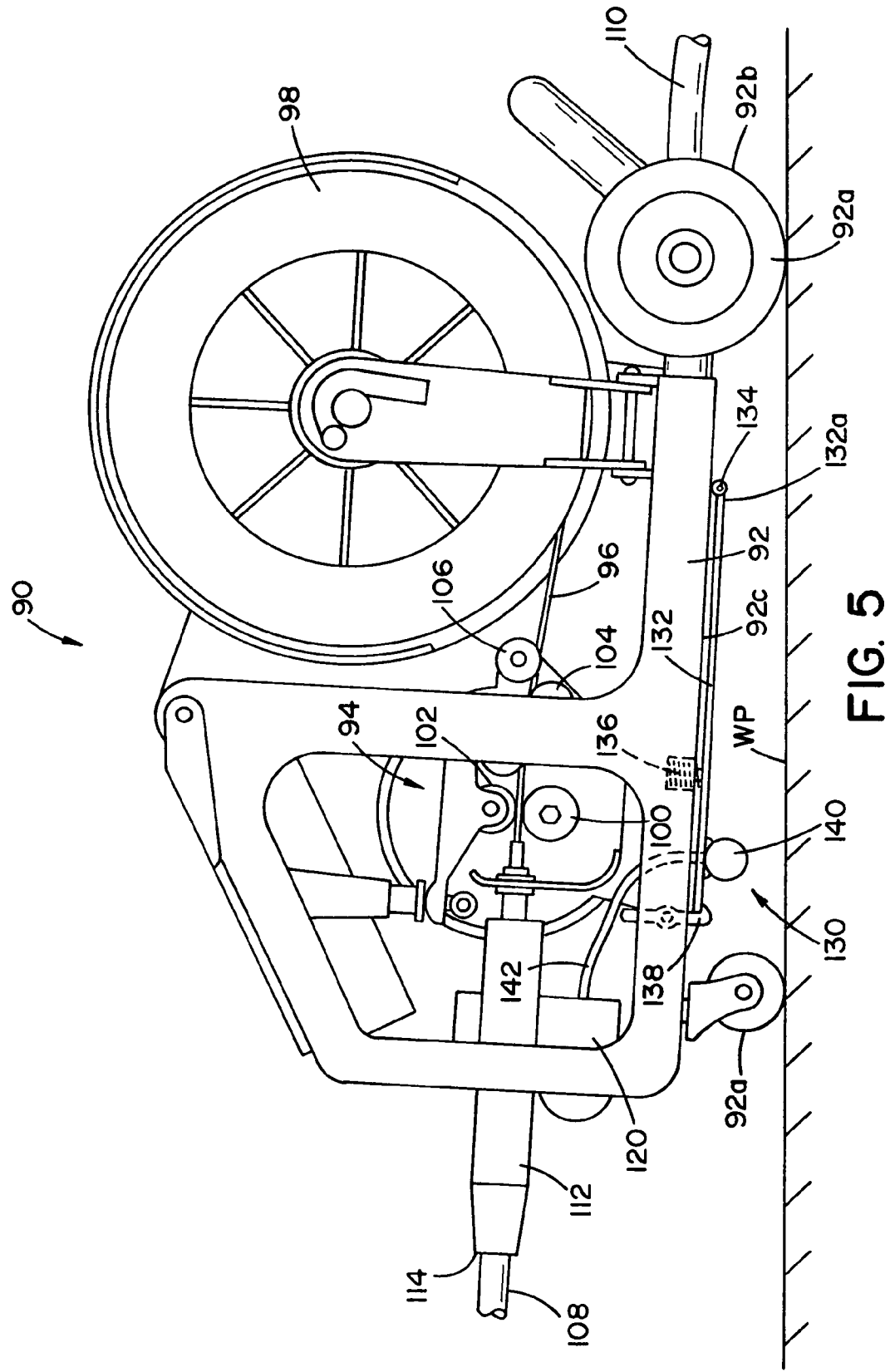
FIG. 5 is a side elevation view of a portable wire feeder, which can be the wire feeder of FIG. 3, having a grounding member shown in a retracted position.

FIG. 1 schematically shows a prior art electric arc welder or system for electric arc welding generally designed by reference numeral 10. The welder 10 includes a wire feeder 12, which can be a portable wire feeder, connected to a power source 14 through an input cable 16 (or electrode lead). In the illustrated welder 10, welding current is delivered to the wire feeder 12 by the input cable 16 and power for the feeder's motorized feeding system (not shown) and the feeder's control circuitry (not shown) is drawn from this welding current. Thus, the wire feeder 12 is powered solely by the arc voltage (or welding current) supplied by the power source 14 through the input cable 16 (i.e., no separate cable or lead delivers power from the power source 14 to the wire feeder 12).

As is known and understood by those skilled in the art, the wire feeder 12 is additionally connected to a welding gun 18 by a guide hose 20. The motorized feeding system of the wire feeder 12 is used to selectively advance or pay welding electrode wire (not shown) through the guide hose 20 to the welding gun 18. As illustrated, the power source 14 can be grounded (i.e., electrically connected) to work piece WP through a power source work lead or cable 22. The cable 22 typically includes a clip or clamp 22a enabling the same to be removably secured or connected to the work piece WP. With the power source 14 grounded to a work piece WP, gun trigger 18a can be actuated to selectively connect the welding current delivered to the wire feeder 12 to the wire passing through the guide hose 20 and create a welding arc between the gun 18 (and specifically an exposed portion of the electrode wire extending from the gun) and the work piece WP. Trigger 18a can also be used to actuate the motorized feeding system of the wire feeder 12 to deliver consumable welding wire to the gun 18.

As is also known and understood by those skilled in the art, the wire feeder control circuitry can be used to: operate the motorized feeding system; sense and display measurements related to the welding current, such as display the arc voltage passing through to the gun 18; selectively connect the welding wire to the welding current supplied by the power source 14, such as through a contactor; and/or enable the trigger 18a to be used for operating a contactor of the wire feeder 12. To complete a power circuit passing though and powering the motorized feeding system and/or the control circuitry, the wire feeder 12 is grounded to the work piece through a wire feeder work lead or cable 24 which, like cable 22, includes a clip or clamp 24a enabling the cable 24 to be removably secured or connected to the work piece WP. Thus, power drawn from the welding current and used to power various components of the wire feeder 12 (e.g., the motorized feeding system and the feeder's control circuitry) is grounded through work lead 24. Optionally, a control cable (not shown) can extend between the power source 14 and the wire feeder 12 for communicating control signals between the power source and the wire feeder.

FIG. 2 schematically shows another prior art electric arc welder or system 30 including a wire feeder 32, which can be a portable wire feeder, connected to a power source 34 through an input cable 36 (or electrode lead). Thus, like welder 10 of FIG. 1, welding current is delivered to the wire feeder 32 through the input cable 36. However, unlike welder 10, welder 30 has power for the wire feeder's motorized feeding system (not shown) and control circuitry delivered through a control cable 38 extending between the power source 34 and the wire feeder 32 separately from the input cable 36. While control cable 38 can communicate control signals between the power source 34 and the wire feeder 32 (like the optional control cable of welder 10), control cable 38 additionally has electrical lines (e.g., positive and negative) such that power can be delivered to the feeder for its motorized feeding system and other electronics and can be grounded back through the power source 34. In this arrangement, a complete power circuit is formed with the feeder's motorized system and control circuitry through the control cable 38 and thus the wire feeder 32 does not need to be otherwise directly grounded to the work piece (unlike feeder 12 of welder 10), but requires an extra cable and associated cable connecting between the wire feeder and the power source.

The motorized feeding system and control circuitry of the wire feeder 32 can otherwise be like those of the wire feeder 12. Also like the wire feeder 12, the wire feeder 32 is additionally connected to a welding gun 40 by a guide hose 42 and the power source 34 can be grounded (i.e., electrically connected) to work piece WP through a power source work lead or cable 44, which can include a clip or clamp 44a for enabling the cable 44 to be removably secured or connected to the work piece WP. With the power source 34 grounded to a work piece WP, gun trigger 40a can be actuated to selectively connect the welding current delivered to the wire feeder 32 to the wire passing through the guide hose 20 and create a welding arc between the gun 18 (and specifically an exposed portion of the electrode wire extending from the gun) and the work piece WP. Also, the trigger 40a can be used to actuate the motorized feeding system of the wire feeder 32 to deliver consumable welding wire to the gun 40.

With reference to FIG. 3, an electric arc welder or system 50 for electric arc welding is. shown according to one exemplary embodiment. The welder 50 includes a wire feeder 52 connected to a remotely positioned power source 54 by an input cable 56 (or electrode lead). Through the input cable 56, the power source 54 delivers welding current to the wire feeder. As will be described in more detail below, the wire feeder 52 can be a portable wire feeder solely powered by an arc voltage (or welding current) supplied by the power source 54. Alternatively, the wire feeder (or its housing) can be configured as a tractor wire feeder or some other type of wire feeder solely powered by an arc voltage supplied through an input cable connected to a power source. Like the prior art feeders 12, 32, a welding gun 58 is connected to the wire feeder 52 by a guide hose 60 which allows for specifically locating a welding operation. In the illustrated embodiment, the gun 58 is directed to create an intersecting joint between the work piece WP and a secondary work piece SWP.

The power source 54, which can be an AC or DC power source and can be fitted with whatever controls may be needed (none illustrated in FIG. 3), is electrically connected (or grounded) to work piece WP by a power source work cable or lead 62. The cable 62 can include a clip or clamp 62a enabling the cable 62 to be removably secured or connected to the work piece WP. The illustrated wire feeder 52 includes a work sense contact member or assembly 64 (shown as part of and/or extending from a side or surface 52a of a housing or frame 52a of the wire feeder in the illustrated schematic embodiment that is directed opposed to work piece WP) for electrically connecting (or grounding) the wire feeder and its housing 52a to the work piece WP. As will be described in more detail below, gun trigger 58a can be actuated to selectively connect the welding current delivered to the wire feeder 52 to wire (74 in FIG. 4) passing through guide hose 60 and create a welding arc between the gun 58 (and specifically an exposed portion 74a of electrode wire extending from and/or held by the gun 58) and the work piece WP.

With additional reference to FIG. 4, the wire feeder 52 includes an input 70a that is electrically connected to the power source 54 by input cable 56 for receiving welding current (i.e., arc voltage) from the power source. Power for a motorized feeding system 72 of the wire feeder 52 and the wire feeder's control circuitry is drawn from the welding current supplied by the power source 54 and, in the illustrated embodiment, passed through a power converter 66 (such as a rectifier, for example). The remaining electrode 56a (or welding current) is directed through a contactor 68 and to an output 70b of the wire feeder 52. Thus, the output 70b is electrically connected (selectively) to the input 70a to receive welding current delivered to the input from the power source and to provide the welding current to the welding operation through guide hose 60. The power drawn off the welding current and passing through the power converter 66 is used to power a motorized feeding system 72 and other control circuitry of the wire feeder 52. As is well known to those skilled in the art, the motorized feeding system 72 includes a motor 72a and driver rollers 72b,72c to selectively advance or pay welding electrode wire 74 from a supply of wire, such as spool 76, to the output 70b and through the guide hose 60 to the welding gun 58. The output 70b additionally serves to provide the wire 74 to the welding operation through the guide hose 60.

Other control circuitry can include, for example, circuit board or controller 78 which can receive and direct power from the power converter 66 and send/receive signals for operating the wire feeder 52. The controller 78 could, for example, operate the contactor 68 to selectively direct welding current 56a from the input 70a to output 70b, operate the motor 72a of the motorized feed system, operate a display 80 (which could display arc voltage, for example), etc. Typically, the controller 78 is electrically connected to a trigger 58a of the gun through the output 70b and guide hose 60 and further electrically connected to both the contactor 68 and the motor 72a so that, upon receipt of an actuation signal from the trigger 58a (occurring upon depression of the trigger), the controller 78 actuates the motor 72a (and thereby the motorized feeding system 72) and actuates the contactor 68 to send welding current from the input 70a to the output 70b wherein it is electrically connected to wire 74.

To complete respective power circuits, the power source 54 is grounded to the work piece WP through lead 62 and power converter 66 of the wire feeder 52 is grounded to the work piece through grounding assembly 64 (shown in FIG. 4 as lead 64'), thereby grounding the motorized feeding system 72 and other control circuitry (e.g., circuit board 78, display 80, etc.) of the wire feeder 72. As will be described in more detail below, the grounding assembly 64 nonattachably connects (e.g., is not mechanically, magnetically, or adhesively attached) the work piece WP of the welding operation to electrically ground the power drawn from the welding current directly to the work piece WP. Although not included in the illustrated embodiment, a control cable can optionally extend between the power source 42 and the wire feeder 40. Such a control cable could be used to communicate control signals between the power source 54 and the feeder 52, for example.

Optionally, a switch 82 can be provided for disrupting the completed circuit of the drawn power and the grounding to the work piece WP (i.e., selectively isolating the power drawn from the welding current to power the feeder). In one embodiment, the switch is disposed between the power converter 66 and the grounding assembly 64 (or lead 64'). Specifically, as shown, the switch 82 can be disposed between the power converter 66 and the work piece WP and immediately upstream of the grounding assembly 64 to selectively ground the power drawn from the welding current. The switch 82 can include actuator 84 provided on the housing of the feeder for operation by an operator. The switch 82 is movable to a first position wherein power drawn from the welding current is isolated by disconnecting the grounding assembly 64 electrically from the work piece WP and a second position wherein the grounding assembly 64 is electrically connected to the work piece WP.

With additional reference to FIG. 5, a portable wire feeder 90, which could be the wire feeder 52 of FIGS. 3 and 4, is shown having a grounding assembly 130 according to one exemplary embodiment. As will be described in more detail below, the grounding assembly 130 serves to ground electrical components of the wire feeder 90 to the work piece WP. As illustrated, the portable wire feeder 90 can include a frame or housing 92, which can be fabricated from sheet metal, and can have wheels 92a (in the illustrated embodiment, wheels 92a include one or more pivotal front wheels) for facilitating mobility of the wire feeder.

The wire feeder 90 additionally includes a wire advancing mechanism 94 connected to the housing 92 for moving wire 96 from a wire supply 98 to a welding gun (not shown, but could be like welding gun 58 of FIGS. 3 and 4). In the illustrated embodiment, the wire supply 98 is a wire spool about which wire 96 is spooled. The wire advancing mechanism 94 includes a plurality of rollers 100,102,104,106, including pinch rollers 100,102, to pull the wire 96 from the spool 98 and direct (i.e., advance or pay forward) the wire into wire guide tube 108. The wire guide tube 108 specifically directs the advancing wire, which forms the electrode, to the welding gun. Further details on the wire advancing mechanism 94 and wire straightening devices, often employed therewith, are not given in that they are generally known in the art.

The wire feeder 90 is connected to a power source (not shown, but could be power source 54 of FIGS. 3 and 4) by an electric power cord or cable 110, also referred to herein as an electrode lead. Although not shown, the feeder 90, and more particularly, the feeder housing 92, can include an input (like input 70a) to which the power cable 110 can be connected. The power cable 110 serves to electrically connect the wire feeder 90 to the power source and provide high current electrical power to the wire feeder and ultimately to the gun connected to the wire feeder. The cable 110 additionally serves to provide power to the feeder 90 for its motorized drive system (i.e., wire advancing mechanism 94) and/or the feeder's various controls, such as those described in reference to wire feeder 52 of FIGS. 3 and 4.

More particularly, as described above in wire feeder 52, power for the feeder 90 is drawn from the high current electrical power delivered to the feeder by the electrode lead 110. Optionally, a control cable (not shown) can separately connect the wire feeder 90 to the power source for communicating control signals between the power source and the wire feeder 90. Even in such a control cable arrangement, however, power for the feeder's advancing mechanism 94 and the feeder's control circuitry is still drawn from the electrode supplied through input cable 110. In any of these described arrangements, the illustrated feeder 92 can operate over a wide voltage range, such as, for example, 34-50 volts AC or 40 volts DC.

With continued reference to FIG. 5, an electrode head 112 (also referred to herein as a wire feeder output) extends forwardly from the wire advancing mechanism 94 and can provide an electrical connection between the welding power supply and the welding operation. More specifically, the electrode head 112 is secured to the frame 92 and has an outlet 114 connected to the wire guide tube 108. The head 112 is selectively able to be electrically connected to the power cable 110 (such as through a contactor, like contactor 68 of FIG. 4). Between the input cable 110 and the electrode head 112, power for the wire feeder 90 can be drawn off the arc voltage and directed through a power converter 120 (such as described in reference to FIG. 4 and power converter 66). Other details of the portable wire feeder 90 can be the same or similar to those shown and described in commonly owned U.S. Pat. No. 6,705,563 and U.S. application Ser. No. 10/800, 928, filed on Mar. 15, 2004 and entitled "WIRE FEEDER", both expressly incorporated herein by reference, and/or features of wire feeders shown and described in these references can be added to the wire feeders of the embodiments disclosed herein.

Figure 6:
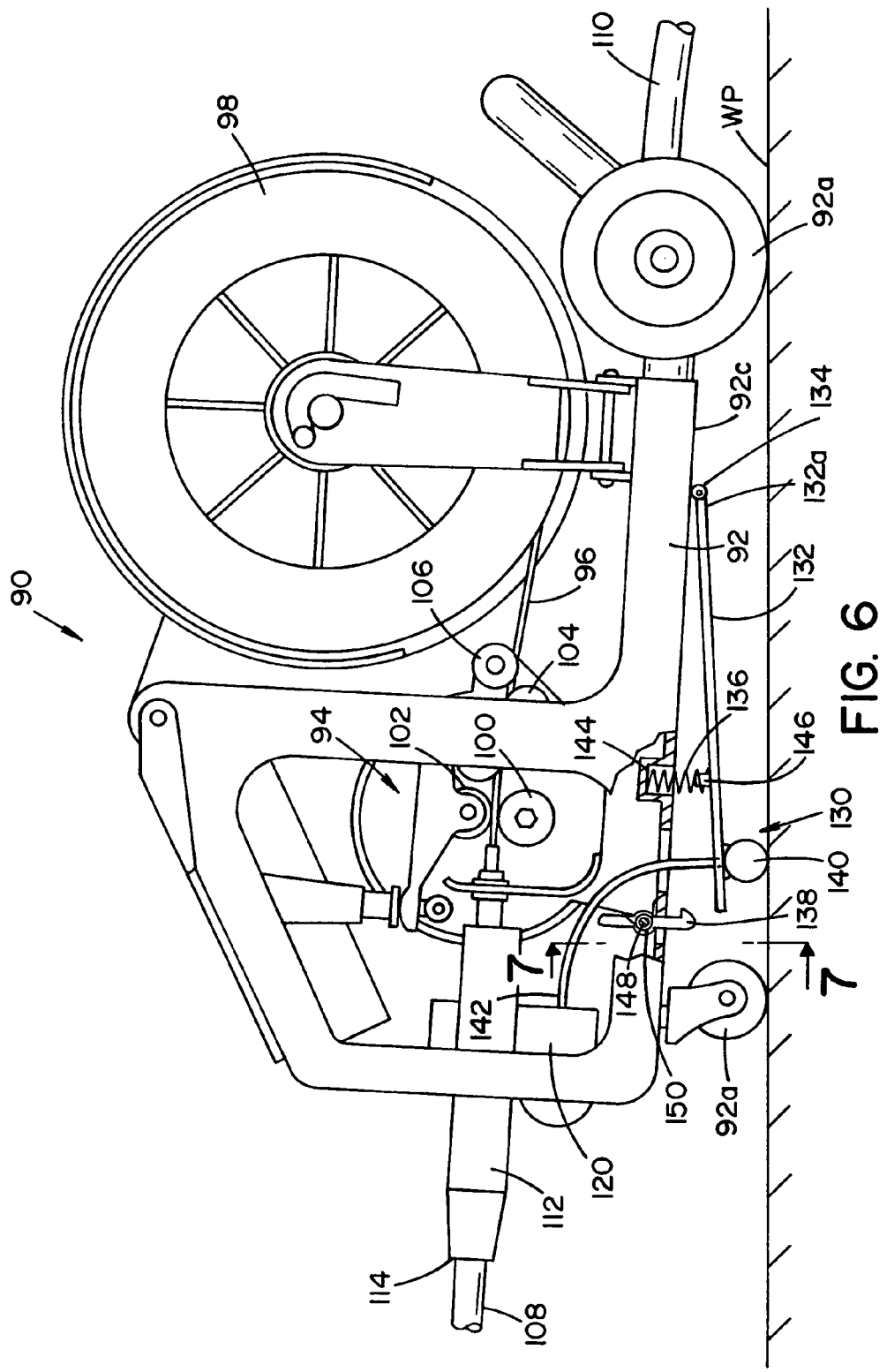
FIG. 6 is a side elevation view (partially in cross section) of the portable wire feeder of FIG. 5 shown with the grounding member shown in an extended, contact position.
Figure 7:
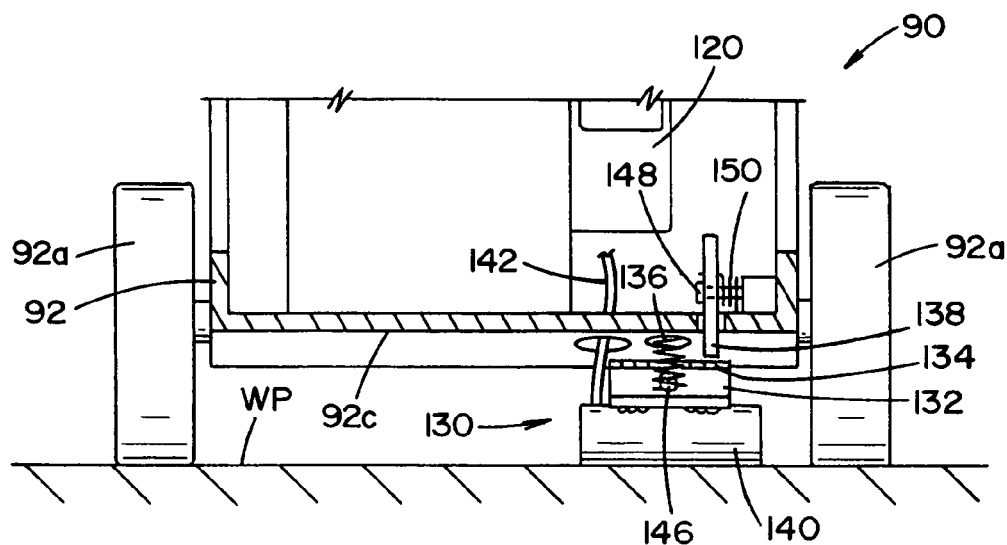
FIG. 7 is a cross section view of the portable wire feeder taken along the line 7-7 of FIG. 6.

With reference to FIGS. 5-7, the wire feeder 90 and, more specifically, the housing or frame 92 of the wire feeder includes a grounding assembly 130 for selectively electrically connecting the wire feeder 90 directly to work piece WP without physically attaching thereto which allows greater mobility of the housing 92 and the feeder 90 about the work piece WP, as well as permits electrical grounding of the feeder 90 even when no convenient location exists for attachment of a clip or clamp (as required by prior art feeders 12.and 32). The grounding assembly 130, which extends from a surface 92c of said wire feeder housing 92 facing the work piece WP, of the illustrated wire feeder 90 includes a pivot member 132 having a first end 132a rotatably connected to the frame 92 by pivot pin 134. A biasing mechanism, such as spring 136, urges the pivot member 132 toward an open or extended position (shown in FIGS. 6 and 7), but a selectively movable latch 138 selectively holds or maintains the pivot member 132 in a closed or retracted position (shown in FIG. 5).

A contact member 140 is attached (via welding in the illustrated embodiment) to the pivot member 132 at a location spaced from the first end 132a such that the contact member 140 can physically and thereby electrically contact the work piece WP when the pivot member 132 is allowed to be urged to the open position. The contact member 140 is electrically connected to the power converter by sense lead 142 thereby grounding the wire feeder 90 to the work piece (such as wire feeder 52 is grounded in FIG. 4). As shown, the pivot member 132 is selectively movable between the extended position wherein the contact member 140 is in contact with and electrically connected to the work piece WP and the retracted position wherein the contact member 140 is spaced from and electrically disconnected from the work piece WP.

More specifically, in the illustrated wire feeder 90, the spring 136 has one end received in a recess 144 of the frame 92 and another end received over a raised boss 146 provided on the pivot member 132. The latch 138 is rotatably mounted to the frame 92 by pivot pin 148 and urged to a locked or latched position by a bias mechanism, such as spring 150. In the latched position, the latch 138 maintains the pivot member 132 in the retracted position against the urging of the spring 1146. To selectively move or allow the pivot member 132 to rotate to the extended position, the latch 138 is moved against its spring 150 which allows the spring 136 to move the pivot member 132 to the extended position wherein the contact member 140 engages and electrically connects to the work piece WP. When the contact member 140 is electrically connected to the work piece WP, the power converter 120 is grounded thereby grounding the wire feeding mechanism 94 and other control circuitry of the wire feeder 90.

Figure 9:
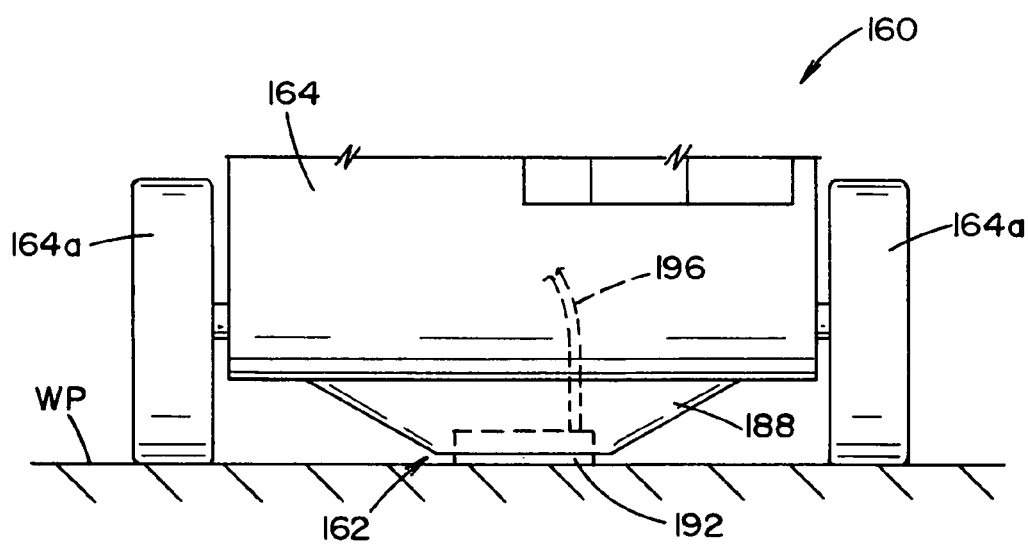
FIG. 9 is an end elevation view of the portable wire feeder of FIG. 8.
Figure 8:
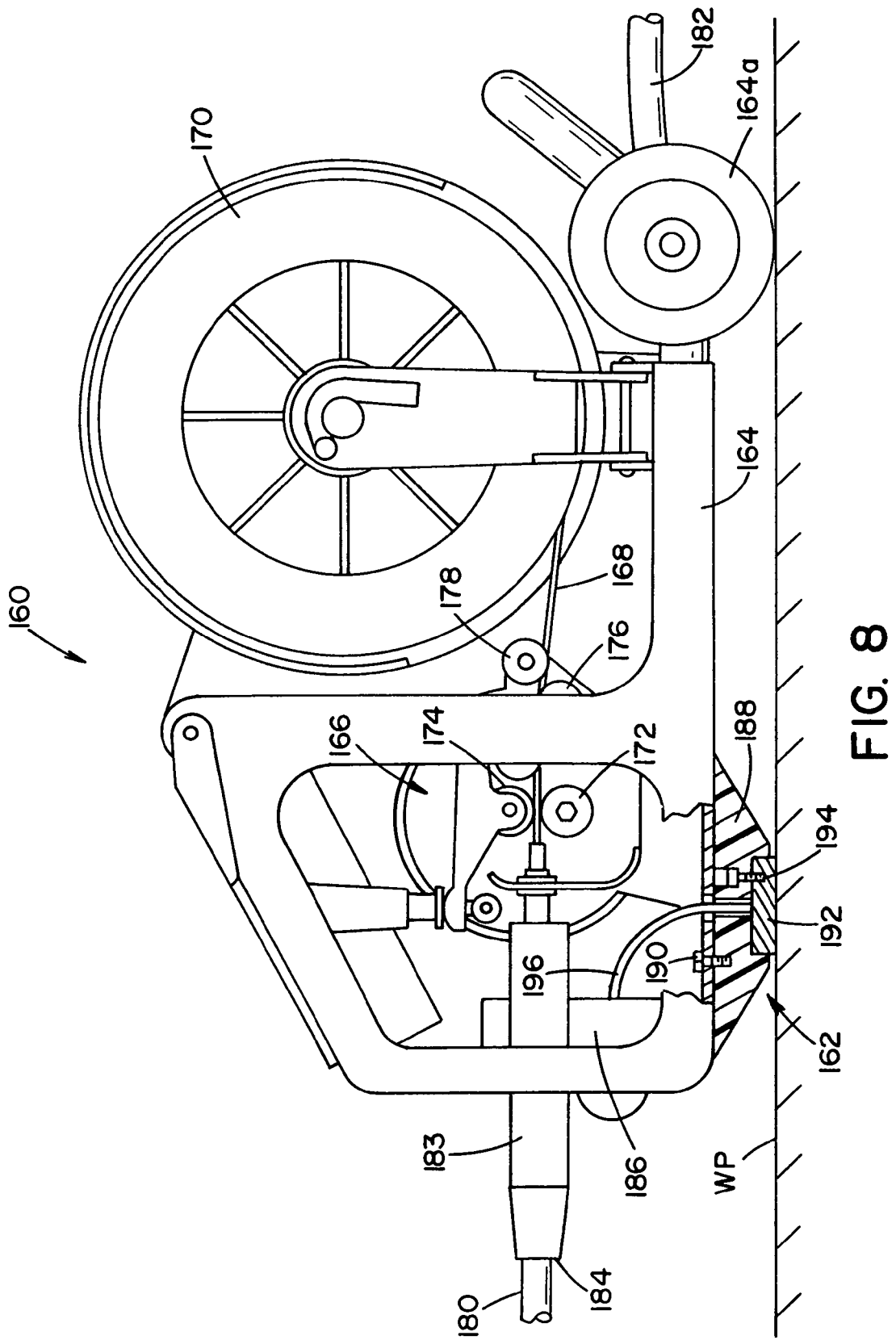
FIG. 8 is a side elevation view (partially in cross section) of a portable wire feeder having an alternate grounding member according to another exemplary embodiment.

With reference to FIGS. 8 and 9, a portable wire feeder 160, which could be the wire feeder 52 of FIGS. 3 and 4, is shown having a grounding assembly 162 according to another exemplary embodiment. As already discussed, the grounding assembly 162 serves to ground electrical components (e.g., motorized wire drive system) of the wire feeder 160 to work piece WP. As shown, the wire feeder 160 of FIGS. 8 and 9 includes a frame or housing 164, which can be fabricated from sheet metal, and can have wheels 164a for facilitating mobility of the wire feeder.

The wire feeder 160 additionally includes a wire advancing mechanism 166 connected to the housing 164 for moving wire 168 from a wire supply, such as a spool 170 of wire, to a welding gun (not shown). The wire advancing mechanism 166 includes a plurality of rollers 172,174,176,178, including pinch rollers 172,174, to pull the wire 168 from the spool 170 and direct the wire into wire guide tube 180, which serves to direct the wire to the welding gun. As with the wire feeder 90, further details on the wire advancing mechanism 166 of the wire feeder 160 and wire straightening devices, often employed therewith, are not given in that they are generally known in the art.

In most respects, except as described herein, the wire feeder 160 is the same or similar to the wire feeder 90. For example, the wire feeder 160 is connected to a power source (not shown, but could be power source 54 of FIGS. 3 and 4) by an electric power cord or cable 182, which can alternately be referred to as an electrode lead. The cable 182 serves to electrically connect the wire feeder 160 to the power source and provide high current electrical power to the wire feeder and ultimately to the gun connected to the wire feeder. The cable 182 additionally serves to provide power to the wire feeder 160 for its motorized drive system (i.e., wire advancing mechanism 166) and/or the feeder's various controls or control circuitry, such as those described in reference to wire feeder 52 of FIGS. 3 and 4.

More particularly, as described above in reference to wire feeders 52 and 90, power for the feeder 160 is drawn from the high current electrical power delivered to the feeder 160 by the electrode lead 182. Optionally, like feeders 52,90, a control cable (not shown) can separately connect the wire feeder 160 to the power source for communicating control signals between the power source and the wire feeder 160. Even when such a control cable is employed, power for the feeder's advancing mechanism 166 and the feeder's control circuitry is still drawn from the electrode supplied through input cable 182. In any configuration, the feeder 160 can operate over a wide voltage range, such as, for example, 35-50 volts AC or 40 volts DC.

An electrode head 183 (also referred to herein as a wire feeder output) extends forwardly from the wire advancing mechanism 166 and can provide an electrical connection between the welding power supply and the welding operation. More specifically, the electrode head 183 is secured to the frame 164 and has an outlet 184 connected to the wire guide tube 180. The head 183 is selectively able to be electrically connected to the power cable 182 (such as through a contactor, like contactor 68 of FIG. 4). Between the input cable 182 and the electrode head 183, power for the wire feeder 160 can be drawn off the arc voltage and directed through a power converter 186 (such as described in reference to FIG. 4 and power converter 66).

With continued reference to FIGS. 8 and 9, the wire feeder 160 and, more specifically, the frame or housing 164 includes grounding assembly 162 for selectively electrically connecting the wire feeder 160 directly to work piece WP without physically attaching thereto which allows greater mobility of the housing 164 and the feeder 160 about the work piece WP, as well as permits electrical grounding of the feeder 160 even when no convenient location exists for attachment of a clip or clamp (as required by prior art feeders 12 and 32). The grounding assembly 162 of the illustrated wire feeder 160 includes a leg member 188 extending toward the work piece WP from the frame 164. In the illustrated embodiment, the leg member 188 is formed of a generally nonconductive material, such as rubber for example, and extends a sufficient distance from the frame 164 to maintain the frame, in combination with its wheels 164a, in spaced relation relative to the work piece WP and/or at a level or parallel position relative to the work piece WP.

The nonconductive leg member 188 can be secured to the frame 164 by any suitable connector or fastener, including for example bolts or screws, adhesive, snap-fit, etc. In the illustrated embodiment, the leg member 188 is attached to the frame 164 by one or more bolts 190. Attached to the leg member 188 and/or formed as part of the leg member is a contact portion or member 192 that engages and electrically connects to the work piece WP when the grounding assembly (and, particularly, the leg member 188 and the contact member 192) rests on the work piece WP. The contact member 192, also referred to herein as a conductive portion, can be secured to the leg member 188 by any suitable connector or faster, including those mentioned in reference to the connection between the leg member 188 and the frame 164. In the illustrated embodiment, the contact member 192 is attached or connected to the leg member 188 by one or more bolts 194. The contact member 192 is electrically connected to the power converter 186 by sense lead 196, thereby grounding the wire feeder 160 to the work piece (such as wire feeder 52 is grounded in FIG. 4). Specifically, the power converter 186 is electrically connected to the electrode or wire 182 for receiving current and is electrically connected (i.e., grounded) to the work piece WP through the grounding assembly 162.

Figure 10:
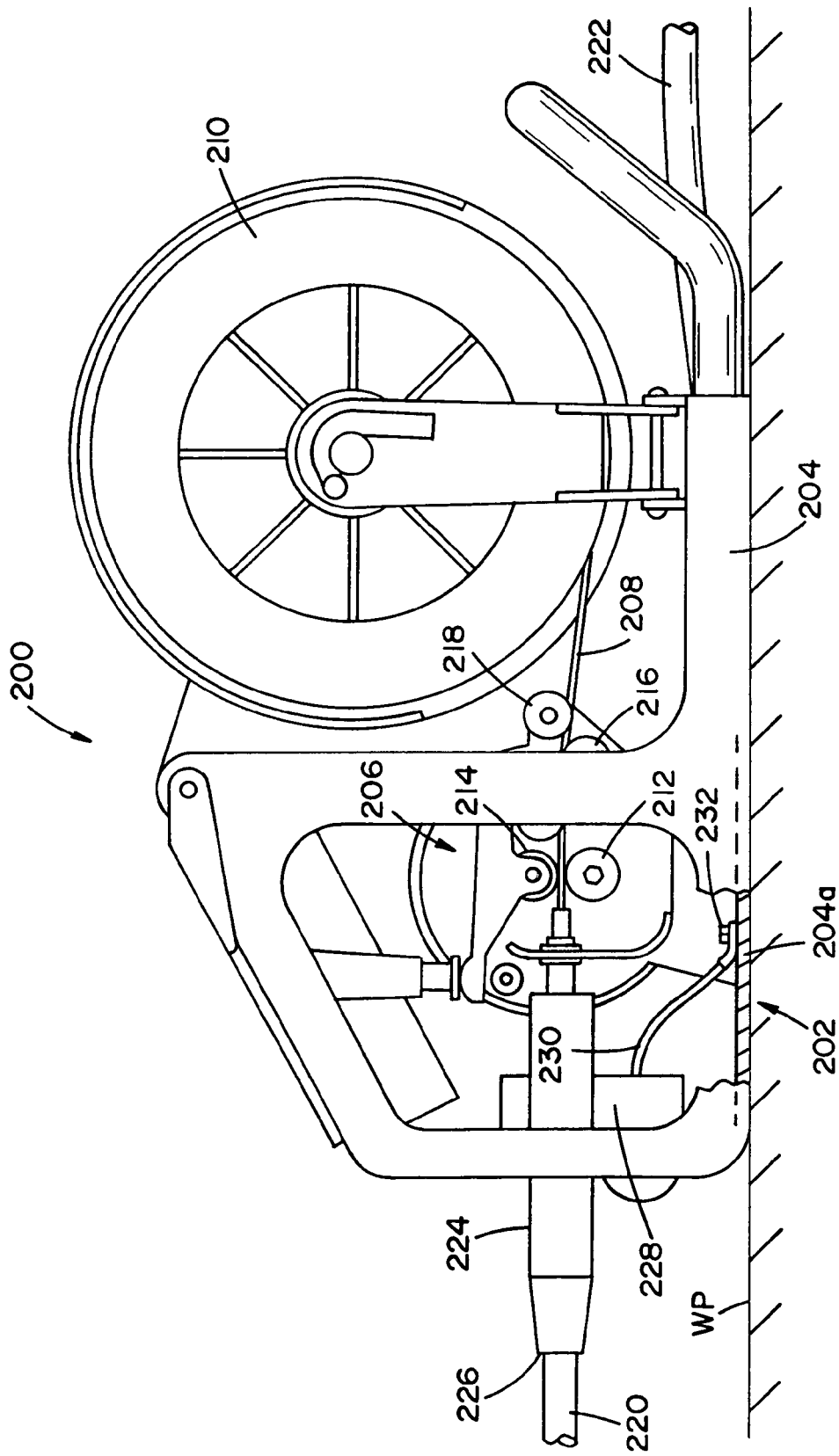
FIG. 10 is a side elevation view (partially in cross section) of a portable wire feeder having another alternate grounding member according to yet another exemplary embodiment.

With reference to FIG. 10, a portable wire feeder 200, which could be the wire feeder 52 of FIGS. 3 and 4, is shown having a grounding assembly 202 according to yet another exemplary embodiment. The grounding assembly 202 serves to ground electrical components (e.g., motorized wire drive system) of the wire feeder 200 to work piece WP. As shown, the wire feeder 200 of FIG. 10 includes a frame or housing 204, which can be fabricated from sheet metal. No wheels are provided on the wire feeder 200 of FIG. 10. Rather, the housing 204 rests directly on work piece WP and the wire feeder 200 is slid about the work surface when moved thereabout. Optionally, electrically conductive skids or feet can be secured to an underside of housing 204.

The wire feeder 200 additionally includes a wire advancing mechanism 206 connected to the housing 204 for moving wire 208 from a wire supply, such as spool 210 of wire, to a welding gun (not shown). The wire advancing mechanism 206 includes a plurality of rollers 212,214,216,218, including pinch rollers 212,214 to pull wire 208 from the spool 210 and direct the wire into wire guide tube 220 which serves to direct the wire to the welding gun. As with the wire feeders 90 and 160, further details on the wire advancing mechanism 206 of the wire feeder 200 and wire straightening devices, often employed therewith, are not given herein in that they are generally known in the art.

In most respects, except as described herein, the wire feeder 200 is the same or similar to the wire feeders 90,160. For example, the wire feeder 200 is connected to a power source (not shown, but could be power source 54 of FIGS. 3 and 4) by an electric power cord or cable 222, alternately referred to as an electrode lead. The cable 222 serves to electrically connect the wire feeder 200 to the power source and provide high current electrical power to the wire feeder and ultimately to the gun connected to the wire feeder. The cable 222 additionally serves to provide power to the wire feeder 200 for its motorized drive system (i.e., wire advancing mechanism 206) and/or the feeder's various controls or control circuitry, such as those described in reference to wire feeder 52 of FIGS. 3 and 4.

More particularly, as described in reference to wire feeders 52,90,160, power for the feeder 200 is drawn from the high current electrical power delivered to the feeder 200 by the electrode lead 222. Optionally, like feeders 52, 90,160, a control cable (not shown) can separately connect the wire feeder 200 to the power source for communicating control signals between the power source and the wire feeder 200. Even when such a control cable is employed, power for the feeder's advancing mechanism 206 and the feeder's control circuitry is still drawn from the electrode supplied through input cable 222. In any configuration, the feeder 220 can operate over a wide voltage range, such as, for example, 35-50 volts AC or 40 volts DC.

An electrode head 224 (also referred to herein as a wire feeder output) extends forwardly from the wire advancing mechanism 206 and can provide an electrical connection between the welding power supply and the welding operation. More specifically, the electrode head 224 is secured to the frame 204 and has an outlet 226 connected to the wire guide tube 220. The head 224 is selectively able to be electrically connected to the power cable 222 (such as through a contactor, like contactor 68 of FIG. 4). Between the input cable 222 and the electrode head 224, power for the wire feeder 200 can be drawn off the arc voltage and directed through a power converter 228 (such as described in reference to FIG. 4 and power converter 66).

The wire feeder 200 and, more specifically, the housing or frame 204 includes a grounding assembly 202 for electrically connecting the wire feeder 200 to work piece WP for electrically connecting the wire feeder 200 directly to work piece WP without physically attaching thereto which allows greater mobility of the housing 204 and the feeder 200 about the work piece WP, as well as permits electrical grounding of the feeder 200 even when no convenient location exists for attachment of a clip or clamp (as required by prior art feeders 12 and 32). The grounding assembly 202 of the illustrated wire feeder 200 includes at least a portion 204a of the housing 204, which is formed of an electrically conductive material, and a sense lead 230 electrically connecting the housing conductive portion 204a to the power converter 228. The sense lead 230 can be secured to the housing portion 204a by any suitable fastener or fastening means, including illustrated bolt 232, for example. As illustrated, when the wire feeder 200 is resting on the work piece WP, the housing portion 204a is in direct contact with the work piece WP thereby electrically connecting to the work piece via its contact (i.e., abutment or engagement) therewith, thereby grounding the wire feeder 200 to the work piece (such as wire feeder 52 is grounded in FIG. 4). Specifically, the power converter 228 is electrically connected to the electrode or wire 222 for receiving current and is electrically connected (i.e., grounded) to the work piece WP through the grounding assembly 202.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claim is:

1. A portable wire feeder for providing welding wire and welding current to a welding operation, said wire feeder comprising:
   an input electrically connected to a power source;
   an output electrically connected to said input to receive welding current delivered to said input from said power source and to provide said welding current and welding wire to the welding operation through a guide hose;
   a motorized wire feeding system including a motor and a feed roll driven by said motor to direct said welding wire from a wire supply to said output for provision of said welding wire to the welding operation through said guide hose, wherein power for said motorized wire feeding system is drawn from said welding current passed from said input to said output; and
   a grounding assembly nonattachably contacting a work piece of said welding operation to electrically ground said power drawn from said welding current directly to the work piece said grounding assembly including a leg member extending from a housing of the wire feeder toward the work piece, said grounding assembly further including a sense lead connected at one end to a conductive portion of said leg member and electrically connected to said power drawn from said welding current for grounding.

2. The portable wire feeder of claim 1 wherein said output is selectively electrically connected to said input to receive welding current by a contactor.

3. The portable wire feeder of claim 1 wherein said power drawn from said welding current is passed through a power converter and said grounding assembly grounds said power by electrically connecting said power converter to the work piece.

4. The portable wire feeder of claim 3 wherein said power converter is a rectifier.

5. The portable wire feeder of claim 3 wherein a switch is disposed between said power converter and said work piece immediately upstream of said grounding assembly to selectively ground said power drawn from said welding current.

6. The portable wire feeder of claim 3 further including a housing on which said input and said output are disposed and within which said motorized wire feeding system is disposed, said housing including a conductive portion in direct contact with the work piece, said grounding assembly including said conductive portion and a sense lead electrically connecting said conductive portion to said power converter.

7. The portable wire feeder of claim 1 further including a welding gun at an end of said guide hose having a trigger for selective operation of said wire feeder.

8. The portable wire feeder of claim 7 further including a controller for operating said motor upon actuation of said trigger, said controller powered by said power drawn from said welding current.

9. The portable wire feeder of claim 8 further including a display powered by said power drawn from said welding current, said display operated by said controller.

10. The portable wire feeder of claim 8 wherein said output is selectively electrically connected to said input to receive welding current by a contactor, said controller operating said contactor in response to said actuation of said trigger.

11. The portable wire feeder of claim 1 further including a switch for selectively isolating said power drawn from said welding current by disconnecting said grounding assembly electrically from said work piece when said switch is in a first position and connecting said grounding assembly electrically to said work piece when said switch is in a second position.

12. The portable wire feeder of claim 1 wherein said grounding assembly is selectively movable between an extended position wherein a contact member of said grounding assembly is in contact with the work piece thereby electrically grounding said power drawn from said welding current directly to the work piece and a retracted position wherein said contact member is spaced from and electrically disconnected from the work piece.

13. The portable wire feeder of claim 1 further including a housing on which said input and said output are disposed and within which said motorized wire feeding system is disposed, said grounding assembly rigidly extending from a surface of said housing facing the work piece.

14. The portable wire feeder of claim 1 further including a housing on which said input and said output are disposed and within which said motorized wire feeding system is disposed, said grounding assembly disposed on a portion of said housing adjacent or opposed to the work piece.

15. A welding wire feeder comprising:
a housing electrically connected to a power source to receive welding current therefrom and having power for said housing drawn from said welding current, said power source grounded to a work piece of said welding operation;
a guide hose extending from said housing to said welding operation;
an output disposed on said housing for providing said welding current received from said power source to said welding operation through said guide hose; and
a grounding assembly extending from a side or surface of said housing directly opposing said work piece and electrically grounding said power drawn from said welding current for said housing, wherein said grounding assembly includes a conductive portion of said housing in direct contact with the work piece, and wherein said conductive portion of said housing is one of skids or feet of said housing.

16. The wire feeder of claim 15 wherein the housing is a portable feeder housing or a tractor feeder housing.

17. The wire feeder of claim 15 further including a wire advancing mechanism connected to said housing for paying consumable welding wire from a wire supply to a welding gun provided on a distal end of said guide hose, said gun including a gun trigger for initiating said welding operation and actuating said wire advancing mechanism.

18. The wire feeder of claim 15 wherein said wire supply is one of a canister of coiled welding wire, a box of coiled welding wire and a spool of welding wire.

19. A welding wire feeder comprising:
a housing electrically connected to a power source to receive welding current therefrom and having power for said housing drawn from said welding current, said power source grounded to a work piece of said welding operation;
a guide hose extending from said housing to said welding operation;
an output disposed on said housing for providing said welding current received from said power source to said welding operation through said guide hose; and
a grounding assembly extending from a side or surface of said housing directly opposing said work piece and electrically grounding said power drawn from said welding current for said housing, wherein said grounding assembly includes a leg member having a conductive portion extending toward said work piece, said grounding assembly further includes a sense lead connected at one end to said conductive portion of said leg member and electrically connected to said power drawn from said welding current to ground said power to said work piece.

20. The wire feeder of claim 19 wherein said leg member is selectively movable between an extended position wherein said conductive portion is in contact with said work piece and a retracted position wherein said conductive portion is spaced from and electrically disconnected from said work piece.

21. The wire feeder of claim 20 wherein said leg member is urged toward said extended position by a spring disposed on said housing.

* * * * *